United States Patent
Ahn et al.

(10) Patent No.: US 12,227,650 B2
(45) Date of Patent: Feb. 18, 2025

(54) METHOD OF PREPARING SILICONE-ACRYLATE HYBRID COMPOSITION AND HYBRID COMPOSITION FORMED THEREBY

(71) Applicants: DOW SILICONES CORPORATION, Midland, MI (US); DOW GLOBAL TECHNOLOGIES LLC, Midland, MI (US); NORTHWESTERN UNIVERSITY, Evanston, IL (US)

(72) Inventors: Dongchan Ahn, Midland, MI (US); Jeremy Beebe, Midland, MI (US); Shane Mangold, Midland, MI (US); Ken Shull, Evanston, IL (US); Muzhou Wang, Evanston, IL (US); Anthony Silvaroli, Evanston, IL (US); Tyler Heyl, Evanston, IL (US)

(73) Assignees: DOW GLOBAL TECHNOLOGIES LLC, Midland, MI (US); DOW SILICONES CORPORATION, Midland, MI (US); NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 17/789,177

(22) PCT Filed: Dec. 23, 2020

(86) PCT No.: PCT/US2020/066827
§ 371 (c)(1),
(2) Date: Jun. 25, 2022

(87) PCT Pub. No.: WO2021/138191
PCT Pub. Date: Jul. 8, 2021

(65) Prior Publication Data
US 2023/0042417 A1    Feb. 9, 2023

Related U.S. Application Data

(60) Provisional application No. 62/955,544, filed on Dec. 31, 2019.

(51) Int. Cl.
*C08L 83/04* (2006.01)
*C08L 83/06* (2006.01)

(52) U.S. Cl.
CPC ........... *C08L 83/06* (2013.01); *C08J 2383/04* (2013.01)

(58) Field of Classification Search
CPC .............................. C08J 2383/04; C08L 83/06
USPC ........................................................ 428/447
See application file for complete search history.

(56) References Cited

U.S. PATENT DOCUMENTS

| | | | |
|---|---|---|---|
| 3,916,033 A * | 10/1975 | Merrill | B29D 11/00076 522/111 |
| 4,774,310 A | 9/1988 | Butler | |
| 4,853,434 A | 8/1989 | Block | |
| 5,109,095 A | 4/1992 | Butler | |
| 5,110,890 A | 5/1992 | Butler | |
| 5,424,375 A | 6/1995 | He et al. | |
| 6,331,578 B1 | 12/2001 | Turner et al. | |
| 6,555,662 B1 | 4/2003 | Bischoff et al. | |
| 6,706,841 B2 | 3/2004 | Sugo et al. | |
| 7,687,585 B2 * | 3/2010 | Karthauser | C08F 283/12 427/536 |
| 7,858,156 B2 | 12/2010 | Crosby et al. | |
| 7,978,416 B2 | 7/2011 | Crosby et al. | |
| 8,802,197 B2 * | 8/2014 | Alm | C08J 7/16 525/445 |
| 2002/0052448 A1 * | 5/2002 | Wang | C08J 7/16 525/242 |
| 2004/0162399 A1 | 8/2004 | Reddy et al. | |
| 2009/0323458 A1 | 12/2009 | Fischer et al. | |
| 2015/0284612 A1 | 10/2015 | Ha et al. | |
| 2015/0376481 A1 * | 12/2015 | Larson | C09J 133/14 524/506 |
| 2016/0032060 A1 | 2/2016 | Jiang et al. | |

FOREIGN PATENT DOCUMENTS

| | | |
|---|---|---|
| CN | 104769069 A | 7/2015 |
| CN | 104968751 A | 10/2015 |
| EP | 1944328 A1 | 7/2008 |
| EP | 2007510 A1 | 12/2008 |
| FR | 2757528 A1 | 6/1998 |
| JP | H11189651 A | 7/1999 |
| JP | 2002332305 A | 11/2002 |
| JP | 2017226719 A | 12/2017 |
| WO | 2005003237 A1 | 1/2005 |

(Continued)

OTHER PUBLICATIONS

International Search Report for PCT/US2020/066827 dated May 27, 2021, 4 pages.
Machine assisted English translation of WO2014157070A1 obtained from https://patents.google.com/patent on Nov. 1, 2022, 13 pages.
Machine assisted English translation of FR2757528A1 obtained from https://patents.google.com/patent on Nov. 4, 2022, 11 pages.
K.W. He; J.M. Widmaier, J.E. Herz; G.C. Meyer (1992). Polydimethylsiloxane/poly(methyl methacrylate) Interpenetrating polymer networks: 2. Synthesis and properties. Polymer, 33(4), pp. 866-871.
Zhang Banghua et al., "Modern polymer science", Chemical Industry Press, Jan. 31, 2006, p. 36.

(Continued)

*Primary Examiner* — Margaret G Moore
(74) *Attorney, Agent, or Firm* — Warner Norcross + Judd LLP

(57) ABSTRACT

A method of preparing a silicone-acrylate hybrid composition is provided. The method comprises irradiating an acrylate composition in the presence of: (i) a silicone article, and/or (ii) a silicone composition; to polymerize the acrylate composition and give the silicone-acrylate hybrid composition. The acrylate composition comprises an acrylate compound and an initiator.

8 Claims, No Drawings

(56) References Cited

FOREIGN PATENT DOCUMENTS

| WO | 20070145996 A2 | 12/2007 |
| WO | 2014157070 A1 | 10/2014 |

OTHER PUBLICATIONS

Luo Shunzhong, "Nuclear technology application", Ed. Harbin: Harbin Engineering University Press, Jan. 31, 2015, p. 201.
Fu Yongshan; An Qiufeng; Yang Gang, "Research progress of silicone modified acrylate polymers", Coatings Industry, 2007, 37(8): 67-71.
Zhang, XZ et al., "Synthesis and properties of silicone modified acrylate emulsion", Advanced Engineering Materials II, Pts 1-3, No. 535-537, Jun. 12, 2013, p. 2491-2494.
Machine assisted English translation of JPH11189651A obtained from <https://patents.google.com/patent> on Dec. 17, 2024, 8 pages.
Machine assisted English translation of JP2017226719A obtained from https://patents.google.com/patent on Dec. 17, 2024, 12 pages.

\* cited by examiner

METHOD OF PREPARING SILICONE-ACRYLATE HYBRID COMPOSITION AND HYBRID COMPOSITION FORMED THEREBY

CROSS-REFERENCE TO RELATED APPLICATIONS

This application is the U.S. National Stage of International Application No. PCT/US2020/066827 filed on 23-12-2020, which claims priority to and all advantages of U.S. Provisional Patent Application No. 62/955,544 filed on 31-12-2019, the content of which is incorporated herein by reference.

TECHNICAL FIELD

This disclosure generally relates to a method of preparing a silicone-acrylate hybrid composition, and to a silicone-acrylate hybrid composition formed according to the method.

BACKGROUND

Radiation curable silicone compositions are used in a wide variety of applications and myriad industries, such as conformal coatings and adhesives, because their rapid ambient cure, flexibility and stability. Silicones, however, generally have lower mechanical strength, toughness and abrasion resistance than a number of other materials, such as acrylics, urethanes, epoxies and olefinic and aromatic polymers. Attempts to combine silicones with such other materials into hybrid curable compositions to realize their complementary benefits are often limited by polymer incompatibility, which results in poor mechanical properties and low light transmission.

BRIEF SUMMARY

A method of preparing a silicone-acrylate hybrid composition is provided. A silicone-acrylate hybrid composition formed in accordance with the method is also provided.

The method comprises irradiating an acrylate composition in the presence of: (i) a silicone article, and/or (ii) a silicone composition; to polymerize the acrylate composition and give the silicone-acrylate hybrid composition. The acrylate composition comprises an acrylate compound and an initiator. The acrylate compound has the general formula (A):

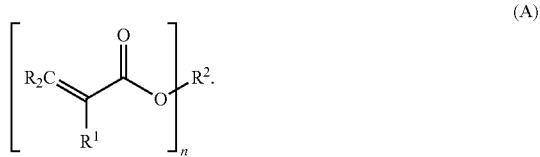

In formula (A), each R is independently selected from H and substituted or unsubstituted hydrocarbyl groups, $R^1$ is H or a substituted or unsubstituted hydrocarbyl group having from 1 to 10 carbon atoms, n is an integer equal to or greater than 1, and $R^2$ is selected from $R^1$, an amine group, an alkyl group, an alkyl group substituted with a hydroxyl group or an amino group, or a moiety having a valency of n greater than 1 to 4.

DETAILED DESCRIPTION

The method of preparing a silicone-acrylate hybrid composition may hereinafter be referred to simply as the "method." Likewise, the silicone-acrylate hybrid composition formed in accordance with the method may hereinafter be referred to simply as the "hybrid composition." The terminology "hybrid composition" should not be construed or interpreted to mean that the hybrid composition is a liquid or an uncured form, as the hybrid composition can be a cured solid, as descried below.

In a first general embodiment, the acrylate composition is irradiated in the presence of the silicone article. In this first general embodiment, the silicone article is generally formed prior to irradiation of the acrylate composition. Thus, the silicone article may be referred to as a "pre-form." The silicone article may alternatively be partially cured in the method, and further cured during and/or after irradiation of the acrylate composition. For example, the acrylate composition can be irradiated while heat is applied to the silicone article to effect further curing, i.e., the method may be a dual-cure method.

In these embodiments, the silicone article is substantially or completely cured prior to irradiation of the acrylate composition. The silicone article can be formed via various cure mechanisms understood in the art, and is not limited to a particular cure mechanism. Exemplary cure mechanisms for the silicone article are described further below, and include but are not limited to, addition-curable silicone compositions and condensation-curable silicone compositions. Similarly, as described below, the silicone article can be selected and characterized by the silicone composition utilized to prepare the silicone article. For example, the silicone article can be a rubber, an elastomer, resinous, etc.

In this first general embodiment, the acrylate composition polymerizes via radiation in the presence of the photoinitiator and the silicone article to form a polymer (or "acrylate polymer") in-situ. The silicone article, acrylate composition, and photoinitiator are described in greater detail below. The acrylate polymer together with the silicone article give the hybrid composition.

In a second general embodiment, the acrylate composition is irradiated in the presence of the silicone composition. The silicone composition cures, polymerizes, and/or cross-links to form a silicone article, and the acrylate composition polymerizes via radiation and the photoinitiator to form a polymer. In certain embodiments described further below, irradiation also initiates cure of the silicone composition.

The silicone article and/or polymer may be the same as or different from the silicone article and/or polymer between the first and second general embodiments. In the second general embodiment, however, the silicone article and acrylate polymer generally form at the same time and in the presence of one another. Thus, in the second general embodiment, the polymeric formation may be referred to as simultaneous or "one-pot" polymerization. In certain embodiments, curing of at least one of the compositions (i.e., the silicone or acrylate composition) may be initiated prior to cure (or polymerization) of the other. In addition, the silicone and acrylate compositions may be cured simultaneously via different methods, e.g. heat in combination with irradiation.

In a third general embodiment, the acrylate composition is irradiated in the presence of both the silicone article and the silicone composition. This third general embodiment includes aspects of the first and second general embodiments.

In certain embodiments, depending on functional groups present in the silicone composition, the i) silicone article and/or the silicone composition and ii) the acrylate composition may at least partially react with each other. For example, the silicone article and the acrylate polymer may be chemically bonded to one another in the hybrid composition. In other embodiments, the i) silicone article and/or the silicone composition and ii) the acrylate composition do not react with (or are inert with respect to) each other. Thus, in the hybrid composition, the silicone article and the acrylate polymer may be chemically bonded and/or physically interlaced with one another.

Irradiation of the acrylate composition polymerizes the acrylate composition, which in turn gives the hybrid composition. By "hybrid," it is generally meant that the hybrid composition is formed from a combination of two (or more) different starting materials. In various embodiments, the hybrid composition comprises, consists essentially of, or consists of, the silicone article and the acrylate polymer. In certain embodiments, the hybrid composition comprises, consists essentially of, or consists of, the simultaneous reaction product of the silicone and acrylate compositions. The hybrid composition may also be referred to as a silicone-organic elastomer.

In many embodiments, the hybrid composition can be classified as an interpenetrating polymer network (IPN) or a semi-interpenetrating network. For example, in various embodiments, the hybrid composition comprises the silicone article and the acrylate polymer. In these embodiments, the silicone article and the acrylate polymer are at least partially interlaced physically.

As understood in the art, an IPN is a polymer network comprising two or more networks, e.g. a first component network and a second component network, which are at least partially interlaced on a polymer scale but generally not covalently bonded to each other. In general, the polymer network cannot be separated unless chemical bonds are broken. The two or more component networks can be envisioned to be entangled in such a way that they are concatenated and cannot be pulled apart, but not bonded to each other by any chemical bond.

Conversely, a mixture of two or more pre-formed polymer networks is not an IPN. Specifically, simply mixing or otherwise compounding two or more polymers does not create an IPN. Further, if the silicone composition and the acrylate composition react with one another such that the silicone article and the acrylate polymer are chemically bonded to one another in the hybrid composition, the hybrid composition is not an IPN, as the hybrid composition does not comprise two distinct networks, but one hybrid network.

In certain embodiments, the hybrid composition can be classified as a semi-interpenetrating polymer network (SIPN). As understood in the art, a SIPN is a polymer comprising one or more networks and one or more linear or branched polymer(s) characterized by the penetration on a molecular scale of at least one of the networks by at least some of the linear or branched macromolecules. SIPNs are distinguished from IPNs because the constituent linear or branched polymer(s) can, in principle, be separated from the constituent polymer network(s) without breaking chemical bonds.

Similar to IPNs, SIPNs may be classified as sequential SIPNs. These SIPNs are generally where the linear or branched components are formed following the completion of the reactions that lead to the formation of the network(s) or vice versa. Thus, to prepare IPNs and SIPNs, it is to be appreciated that different components may be formed simultaneously or sequentially.

As introduced above, the silicone article can be formed via various cure mechanisms in the art. In various embodiments, the silicone composition is selected from the group consisting of hydrosilylation-curable silicone compositions, condensation-curable silicone compositions, free radical curable silicone compositions, radiation-curable (e.g. by free radical, cationic or hydrosilylation) silicone compositions, ring opening reaction-curable silicone compositions, thiol-ene curable silicone compositions, silicon hydride-silanol reaction curable silicone compositions, epoxy-curable silicone compositions, and combinations thereof. The silicone article can be formed from one or more of these compositions.

In the first general embodiment, the silicone article is generally formed prior to irradiation of the acrylate composition. In specific embodiments, the silicone article is generally formed from a hydrosilylation-curable silicone composition or a condensation-curable silicone composition prior to irradiation of the acrylate composition.

In the second general embodiment, the acrylate composition is generally irradiated in the presence of the silicone composition. In specific embodiments, the acrylate composition is irradiated in the presence of a radiation-curable silicone composition. In this way, both of the compositions polymerize in the presence of the other, and may at least partially react with each other, to form the hybrid composition.

In various embodiments, the silicone composition comprises or is a hydrosilylation-curable silicone composition. The silicone article can be formed from such a composition.

In certain embodiments, the hydrosilylation-curable silicone composition comprises: (A) an organopolysiloxane having an average of at least two silicon-bonded ethylenically unsaturated groups or silicon-bonded hydrogen atoms per molecule; (B) an organosilicon compound having an average of at least two silicon-bonded hydrogen atoms or silicon-bonded ethylenically unsaturated groups per molecule capable of reacting with the silicon-bonded ethylenically unsaturated groups or silicon-bonded hydrogen atoms in the organopolysiloxane (A); and (C) a hydrosilylation catalyst. When the organopolysiloxane (A) includes silicon-bonded ethylenically unsaturated groups, the organosilicon compound (B) includes at least two silicon-bonded hydrogen atoms per molecule, and when the organopolysiloxane (A) includes silicon-bonded hydrogen atoms, the organosilicon compound (B) includes at least two silicon-bonded ethylenically unsaturated groups per molecule. The organosilicon compound (B) may be referred to as a cross-linker or cross-linking agent. In certain embodiments, the organopolysiloxane (A) and/or the organosilicon compound (B) may independently include more than two hydrosilylation-reactive functional groups (e.g. silicon-bonded ethylenically unsaturated groups and/or silicon-bonded hydrogen atoms per molecule, such as an average of 3, 4, 5, 6, or more hydrosilylation-reactive functional groups per molecule. In such embodiments, the hydrosilylation-curable silicone composition may be formulated to be chain-extendable and cross-linkable via hydrosilylation, such as by differing the number and/or type of hydrosilylation-reactive functional groups per molecule of the organopolysiloxane (A) from the number and/or type of hydrosilylation-reactive functional groups per molecule of the organosilicon compound (B). For example, in these embodiments, when the organopolysiloxane (A) includes at least two silicon-bonded ethylenically unsaturated groups per molecule, the organosilicon compound (B) may include at least three silicon-bonded hydrogen atoms per molecule, and when the organopolysiloxane (A) includes at least two silicon-bonded hydrogen atoms, the organosilicon compound (B) may include at least three silicon-bonded ethylenically unsaturated groups per molecule. Accordingly, the ratio of hydrosilylation-reactive functional groups per molecule of the organopolysiloxane (A) to hydrosilylation-reactive functional groups per molecule of the organosilicon compound (B) may be equal to, less than, or greater than 1:1, such as from 1:5 to 5:1, from 1:4 to 4:1, from 1:3 to 3:1, from 1:2 to 2:1, from 2:3 to 3:2, or from 3:4 to 4:3.

The organopolysiloxane (A) and the organosilicon compound (B) may independently be linear, partially branched, branched, cyclic, or resinous (networked). In particular, the organopolysiloxane (A) and the organosilicon compound (B) may comprise any combination of M, D, T, and Q units. The symbols M, D, T, and Q represent the functionality of structural units of organopolysiloxanes. M represents the monofunctional unit $R^0{}_3SiO_{1/2}$. D represents the difunctional unit $R^0{}_2SiO_{2/2}$. T represents the trifunctional unit $R^0SiO_{3/2}$. Q represents the tetrafunctional unit $SiO_{4/2}$. Generic structural formulas of these units are shown below:

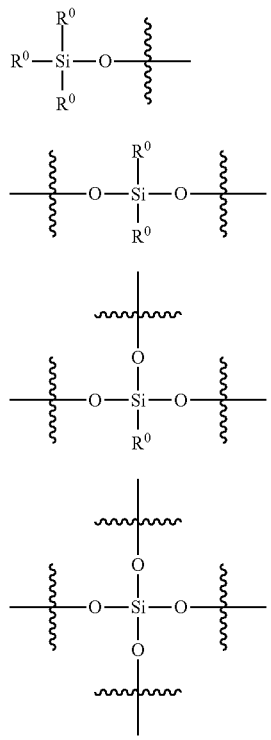

In these structures/formulae, each $R^0$ may be any hydrocarbon group, e.g. an aromatic, aliphatic, alkyl, alkenyl, or alkynyl group, or other moiety, like a hydroxyl group, alkoxy group, or hydrogen atom.

The particular organopolysiloxane (A) and organosilicon compound (B) may be selected based on desired properties of the silicone article or hybrid composition. Selecting the components of the silicone composition allows one of skill in the art to achieve a range of desirable properties.

For example, in certain embodiments, one of the organopolysiloxane (A) and the organosilicon compound (B) comprises a silicone resin, which typically comprises T and/or Q units in combination with M and/or D units. When the organopolysiloxane (A) and/or organosilicon compound (B) comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the resulting silicone article or hybrid composition has increased rigidity.

In many embodiments, the organopolysiloxane (A) and/or the organosilicon compound (B) each comprise repeating D units, and the organopolysiloxane (A) and the organosilicon compound (B) can have independently selected degrees of polymerization. In these embodiments, both the organopolysiloxane (A) and the organosilicon compound (B) are organopolysiloxanes. Such organopolysiloxanes are substantially linear but may include some branching attributable to T and/or Q units. Alternatively, such organopolysiloxanes are linear. In these embodiments, the resulting silicone article and/or hybrid composition is elastomeric.

The silicon-bonded ethylenically unsaturated groups and silicon-bonded hydrogen atoms of the organopolysiloxane (A) and the organosilicon compound (B), respectively, may independently be pendent, terminal, or in both positions.

In certain embodiments, the organopolysiloxane (A) has the general formula:

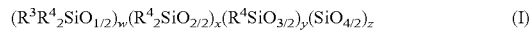

wherein each $R^3$ is an independently selected hydrocarbyl group, which may be substituted or unsubstituted, and each $R^4$ is independently selected from $R^3$ and an ethylenically unsaturated group, with the proviso that at least two of $R^4$ are ethylenically unsaturated groups, and w, x, y, and z are mole fractions such that w+x+y+z=1. As understood in the art, for linear organopolysiloxanes, subscripts y and z are generally 0, whereas for resins, subscripts y and/or z>0. Various alternative embodiments are described below with reference to w, x, y and z. In these embodiments, the subscript w may have a value of from 0 to 0.9999, from 0 to 0.999, from 0 to 0.99, from 0 to 0.9, from 0.9 to 0.999, from 0.9 to 0.99, from 0.8 to 0.99, or from 0.6 to 0.99. The subscript x typically has a value of from 0 to 0.9, from 0 to 0.45, or from 0 to 0.25. The subscript y typically has a value of from 0 to 0.99, from 0.25 to 0.8, or from 0.5 to 0.8. The subscript z typically has a value of from 0 to 0.99, from 0 to 0.85, from 0.85 to 0.95, from 0.6 to 0.85, from 0.4 to 0.65, from 0.2 to 0.5, from 0.1 to 0.45, from 0 to 0.25, or from 0 to 0.15.

In certain embodiments, each $R^3$ is a $C_1$ to $C_{10}$ hydrocarbyl group, which may be substituted or unsubstituted, and which may include heteroatoms within the hydrocarbyl group, such as oxygen, nitrogen, sulfur, etc. Hydrocarbyl groups suitable for $R^3$ may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cycyloheptyl groups. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, hexadecenyl, octadecenyl and cyclohexenyl groups. Examples of suitable monovalent halogenated hydrocarbon groups (i.e., halocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

The ethylenically unsaturated groups represented by $R^4$, which may be the same or different within the organopolysiloxane (A), are typically selected from alkenyl groups and alkynyl groups. "Alkenyl" means an acyclic, branched or unbranched, monovalent hydrocarbon group having one or more carbon-carbon double bonds. Specific examples thereof include vinyl groups, allyl groups, hexenyl groups, and octenyl groups. "Alkynyl" means an acyclic, branched or unbranched, monovalent hydrocarbon group having one or more carbon-carbon triple bonds.

Specific examples thereof include ethynyl, propynyl, and butynyl groups. Various examples of ethylenically unsaturated groups include $CH_2=CH-$, $CH_2=CHCH_2-$, $CH_2=CH(CH_2)_4-$, $CH_2=CH(CH_2)_6-$, $CH_2=C(CH_3)CH_2-$, $H_2C=C(CH_3)-$, $H_2C=C(CH_3)-$, $H_2C=C(CH_3)CH_2-$, $H_2C=CHCH_2CH_2-$, $H_2C=CHCH_2CH_2CH_2-$, $HC\equiv C-$, $HC\equiv CCH_2-$, $HC\equiv CCH(CH_3)-$, $HC\equiv CC(CH_3)_2-$, and $HC\equiv CC(CH_3)_2CH_2-$. Typically, when $R^4$ is an ethylenically unsaturated group, the ethylenic unsaturation is terminal in $R^4$. As understood in the art, ethylenic unsaturation may be referred to as aliphatic unsaturation In these embodiments, the organosilicon compound (B) may be further defined as an organohydrogensilane, an organopolysiloxane, an organohydrogensiloxane, or a combination thereof. The structure of the organosilicon compound (B) can be linear, partially branched, branched, cyclic, or resinous (networked). In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, from 3 to 10 silicon atoms, or from 3 to 4 silicon atoms. The organohydrogensilane can be a monosilane, disilane, trisilane, or polysilane.

Hydrosilylation catalyst (C) includes at least one hydrosilylation catalyst that promotes the reaction between the organopolysiloxane (A) and the organosilicon compound (B). The hydrosilylation catalyst (C) is not limited and may be any known hydrosilylation-reaction catalyst for catalyzing hydrosilylation reactions. Combinations of different hydrosilylation-reaction catalysts may be utilized.

In certain embodiments, the hydrosilylation catalyst (C) comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the hydrosilylation catalyst (C).

Additional examples of catalysts suitable for the hydrosilylation catalyst (C) include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the hydrosilylation catalyst (C).

The hydrosilylation catalyst (C) may be in any suitable form. For example, the hydrosilylation catalyst (C) may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The hydrosilylation catalyst (C) may be in or on a solid carrier. Examples of carriers include activated carbons, silicas, silica aluminas, aluminas, zeolites and other inorganic powders/particles (e.g. sodium sulphate), and the like. The hydrosilylation catalyst (C) may also be disposed in a vehicle, e.g. a solvent which solubilizes the hydrosilylation catalyst (C), alternatively a vehicle which merely carries, but does not solubilize, the hydrosilylation catalyst (C). Such vehicles are known in the art.

In specific embodiments, the hydrosilylation catalyst (C) comprises platinum. In these embodiments, the hydrosilylation catalyst (C) is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art, as exemplified in U.S. Pat. Nos. 4,766,176 and 5,017,654, which are incorporated by reference herein in their entireties.

Complexes of platinum with organopolysiloxanes suitable for use as the hydrosilylation catalyst (C) include 1,3-diethenyl-1,1,3,3-tetramethyldisiloxane complexes with platinum. These complexes may be microencapsulated in a resin matrix. Alternatively, the hydrosilylation catalyst (C) may comprise 1,3-diethenyl-1,1,3,3-tetramethyldisiloxane complex with platinum. The hydrosilylation catalyst (C) may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole (COD)PtCl$_2$ with 0.045 mole COD and 0.0612 moles HMeSiCl$_2$.

The hydrosilylation catalyst (C) may also, or alternatively, be a photoactivatable hydrosilylation-reaction catalyst, which may initiate curing via irradiation and/or heat. The photoactivatable hydrosilylation-reaction catalyst can be any hydrosilylation-reaction catalyst capable of catalyzing the hydrosilylation reaction, particularly upon exposure to radiation having a wavelength of from 150 to 800 nanometers (nm). When the hydrosilylation catalyst (C) is photoactivatable, the silicone composition can be cured along with the acrylate composition in situ by irradiation and/or heat. When the hydrosilylation catalyst (C) is photoactivatable, the silicone composition and the acrylate composition typically do not react with one another and separately cure in the presence of one another to give the hybrid composition.

Specific examples of photoactivatable hydrosilylation-reaction catalysts suitable for the hydrosilylation catalyst (C) include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum (II) bis(1,1,1,5,5,5-hexafluoro-2,4-pentanedioate); (I-cyclopentadienyl)trialkylplatinum complexes, such as (Cp)trimethylplatinum, (Cp)ethyldimethylplatinum, (Cp) triethylplatinum, (chloro-Cp)trimethylplatinum, and (trimethylsilyl-Cp)trimethylplatinum, where Cp represents cyclopentadienyl; triazene oxide-transition metal complexes, such as Pt[C$_6$H$_5$NNNOCH$_3$]$_4$, Pt[p-CN—C$_6$H$_4$NNNOC$_6$H$_{11}$]$_4$, Pt[p-H$_3$COC$_6$H$_4$NNNOC$_6$H$_{11}$]$_4$, Pt[p-CH$_3$(CH$_2$)$_x$—C$_6$H$_4$NNNOCH$_3$]$_4$, 1,5-cyclooctadiene.Pt[p-CN—C$_6$H$_4$NNNOC$_6$H$_{11}$]$_2$, 1,5-cyclooctadiene.Pt[p-CH$_3$O—C$_6$H$_4$NNNOCH$_3$]$_2$, [(C$_6$H$_5$)$_3$P]$_3$Rh[p-CN—C$_6$H$_4$NNNOC$_6$H$_{11}$], and Pd[p-CH$_3$(CH$_2$)$_x$—C$_6$H$_4$NNNOCH$_3$]$_2$, where x is 1, 3, 5, 11, or 17; (η-diolefin) (σ-aryl)platinum complexes, such as (η$^4$-1,5-cyclooctadienyl)diphenylplatinum, η$^4$-1,3,5,7-cyclooctatetraenyl)diphenylplatinum, (η$^4$-2,5-norboradienyl)diphenylplatinum, (η$^4$-1,5-cyclooctadienyl)bis-(4-dimethylaminophenyl)platinum, (η$^4$-1,5-cyclooctadienyl)bis-(4-acetylphenyl)platinum, and (η$^4$-1,5-cyclooctadienyl)bis-(4-trifluormethylphenyl)platinum.
Typically, the photoactivatable hydrosilylation-reaction catalyst is a Pt(II) β-diketonate complex and more typically the catalyst is platinum(II) bis(2,4-pentanedioate).

The hydrosilylation catalyst (C) is present in the composition in a catalytic amount, i.e., an amount or quantity sufficient to promote curing thereof at desired conditions. The hydrosilylation-reaction catalyst can be a single hydrosilylation-reaction catalyst or a mixture comprising two or more different hydrosilylation-reaction catalysts.

The concentration of the hydrosilylation catalyst (C) is sufficient to catalyze the addition reaction between the organopolysiloxane (A) and the organosilicon compound (B). In certain embodiments, the concentration of the hydrosilylation catalyst (C) is sufficient to provide from 0.1 to 1000 ppm of platinum group metal, from 0.5 to 100 ppm of platinum group metal, or from 1 to 25 ppm of platinum group metal, based on the combined weight of the organopolysiloxane (A) and the organosilicon compound (B).

The hydrosilylation-curable silicone composition may be a two-part composition where the organopolysiloxane (A) and organosilicon compound (B) are in separate parts. In these embodiments, the hydrosilylation catalyst (C) may be present along with either or both of the organopolysiloxane (A) and organosilicon compound (B). Alternatively still, the hydrosilylation catalyst (C) may be separate from the organopolysiloxane (A) and organosilicon compound (B) in a third part such that the hydrosilylation reaction-curable silicone composition is a three-part composition.

In specific embodiments, the hydrosilylation-curable silicone composition comprises an organopolysiloxane (A) of the general formula:

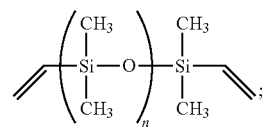

where n is an integer such that the average molecular weight of component (A) is from 100 to 50,000, from 1,000 to 25,000, from 5,000 to 15,000, from 7,500 to 12,500, or from 9,000 to 11,000, g/mol.

In these or other specific embodiments, the hydrosilylation-curable silicone composition comprises an organosilicon compound (B) of the general formula:

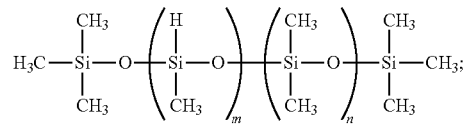

where m is an integer such that the mol % hydride of component (B) is from 5 to 50, from 10 to 45, from 15 to 40, from 20 to 35, or from 25 to 35; and where n is an integer such that the average molecular weight of component (B) is from 10 to 10,000, from 50 to 7,500, from 100 to 5,000, from 500 to 2,500, from 1,000 to 2,500, or from 1,500 to 2,000, g/mol.

In these or other specific embodiments, the hydrosilylation catalyst (C) comprises or is Karstedt's catalyst. Exemplary amounts of the hydrosilylation catalyst (C) are as described above.

Curing conditions for such hydrosilylation-curable silicone compositions may vary. For example, the hydrosilylation-curable silicone composition may be cured upon exposure to irradiation and/or heat. One of skill in the art understands how selection of the hydrosilylation catalyst (C) impacts techniques for solidification and curing. In particular, photoactivatable hydrosilylation catalysts are typically utilized when curing via irradiation is desired.

The organopolysiloxane (A) and organosilicon compound (B) are typically reacted in a molar ratio of from 1:1 to 1:3, from 1:1 to 1:2, from 1:1 to 1:1.5, from 1:1 to 1:1.4, from 1:1 to 1:1.3, from 1:1 to 1:1.2, or from 1:1 to 1:1.1. However, one of skill in the art will select the particular ratios utilized, e.g. in view of the particular components being utilized, desired properties of the silicone composition, etc.

The organopolysiloxane (A) and organosilicon compound (B) can be mixed or otherwise combined using techniques understood in the art. In some embodiments, the reaction is carried out at the elevated temperature. The elevated temperature may be selected and controlled depending on the particular components being utilized. Accordingly, the elevated temperature will be readily selected by one of skill in the art in view of the reaction conditions and parameters selected and the description herein. The elevated temperature is typically from greater than ambient temperature to 180° C., such as from 30 to 150, from 40 to 135, from 50 to 115, from 60 to 100, or from 70 to 85, ° C.

In various embodiments, the silicone composition comprises or is a condensation-curable silicone composition. The silicone article can be formed from such a composition.

In certain embodiments, the condensation-curable silicone composition comprises (A') an organopolysiloxane having an average of at least two silicon-bonded hydroxyl or hydrolysable groups per molecule; (B') an organosilicon compound having an average of at least two silicon-bonded hydrogen atoms, hydroxyl groups, or hydrolysable groups per molecule; and (C') a condensation catalyst. Although any parameter or condition may be selectively controlled during the method or any individual step thereof, relative humidity and/or moisture content of ambient conditions may be selectively controlled to further impact a cure rate of condensation-curable silicone compositions.

The organopolysiloxane (A') and the organosilicon compound (B') may independently be linear, partially branched, branched, cyclic, or resinous (networked). In particular, the organopolysiloxane (A') and the organosilicon compound (B') may comprise any combination of M, D, T, and Q units, as with the organopolysiloxane (A) and the organosilicon compound (B) disclosed above.

The particular organopolysiloxane (A') and organosilicon compound (B') may be selected based on desired properties of the silicone article or hybrid composition. For example, in certain embodiments, one of the organopolysiloxane (A') and the organosilicon compound (B') comprises a silicone resin, which typically comprises T and/or Q units in combination with M and/or D units. When the organopolysiloxane (A') and/or organosilicon compound (B') comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the condensation-curable silicone composition comprises a resin, the resulting silicone article or hybrid composition has increased rigidity.

Alternatively, in other embodiments, the organopolysiloxane (A') and/or the organosilicon compound (B') is an organopolysiloxane comprising repeating D units. Such organopolysiloxanes are substantially linear but may include some branching attributable to T and/or Q units. Alternatively, such organopolysiloxanes are linear. In these embodiments, the resulting silicone article and/or the hybrid composition is elastomeric.

The silicon-bonded hydroxyl groups and silicon-bonded hydrogen atoms, hydroxyl groups, or hydrolysable groups of the organopolysiloxane (A') and the organosilicon compound (B'), respectively, may independently be pendent, terminal, or in both positions.

As understood in the art, silicon-bonded hydroxyl groups result from hydrolyzing silicon-bonded hydrolysable groups. These silicon-bonded hydroxyl groups may condense to form siloxane bonds with water as a byproduct.

Examples of hydrolysable groups suitable for the organopolysiloxane (A') include the following silicon-bonded groups: H, a halide group, an alkoxy group, an alkylamino group, a carboxy group, an alkyliminoxy group, an alkenyloxy group, or an N-alkylamido group. Alkylamino groups may be cyclic amino groups.

In specific embodiments, the organopolysiloxane (A') has the general formula:

$$(R^3R^5_2SiO_{1/2})_{w'}(R^5_2SiO_{2/2})_{x'}(R^5SiO_{3/2})_{y'}(SiO_{4/2})_{z'}$$ (II)

wherein each $R^3$ is defined above and each $R^5$ is independently selected from $R^3$ and a hydroxyl group, a hydrolysable group, or combinations thereof with the proviso that at least two of $R^5$ are hydroxyl groups, hydrolysable groups, or combinations thereof, and w', x', y', and z' are mole fractions such that w'+x'+y'+z'=1. As understood in the art, for linear organopolysiloxanes, subscripts y' and z' are generally 0, whereas for resins, subscripts y' and/or z'>0. Various alternative embodiments are described below with reference to w', x', y' and z'. In these embodiments, the subscript w' may have a value of from 0 to 0.9999, from 0 to 0.999, from 0 to 0.99, from 0 to 0.9, from 0.9 to 0.999, from 0.9 to 0.99, from 0.8 to 0.99, or from 0.6 to 0.99. The subscript x' typically has a value of from 0 to 0.9, from 0 to 0.45, or from 0 to 0.25. The subscript y' typically has a value of from 0 to 0.99, from 0.25 to 0.8, or from 0.5 to 0.8. The subscript z' typically has a value of from 0 to 0.99, from 0 to 0.85, from 0.85 to 0.95, from 0.6 to 0.85, from 0.4 to 0.65, from 0.2 to 0.5, from 0.1 to 0.45, from 0 to 0.25, or from 0 to 0.15.

As set forth above, the condensation-curable silicone composition further comprises the organosilicon compound (B'). The organosilicon compound (B') may be linear, partially branched, branched, cyclic, or resinous (networked). In certain embodiments, the organosilicon compound (B') has the formula $R^3_qSiX_{4-q}$, wherein $R^3$ is defined above, X is a hydrolysable group, and q is 0 or 1.

Specific examples of organosilicon compounds (B') include alkoxy silanes such as $CH_3Si(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O—N=C(CH_3)CH_2CH_3]_3$, $Si[O—N=C(CH_3)CH_2CH_3]_4$, and $CH_2=CHSi[O—N=C(CH_3)CH_2CH_3]_3$; organoacetamidosilanes such as $CH_3Si[NHC(=O)CH_3]_3$ and $C_6H_5Si[NHC(=O)CH_3]_3$; epoxy silanes such as 3-glycidoxypropyl trimethoxysilane and 2-(3,4-epoxycyclohexl)ethyltrimethoxysilane); acrylate and methacrylate silanes such as 3-methacryloxypropyl trimethoxysilane and 3-acryloxypropyltrimethoxysilane; amino silanes such as $CH_3Si[NH(C_4H_9)]_3$ and $CH_3Si(NHC_6H_{11})_3$; and organoaminooxysilanes.

The organosilicon compound (B') can be a single silane or a mixture of two or more different silanes, each as described above. Also, methods of preparing tri- and tetra-functional silanes are well known in the art; many of these silanes are commercially available.

The concentration of the organosilicon compound (B') in the condensation-curable silicone composition is sufficient to cure (cross-link) the organopolysiloxane (A'). The particular amount of the organosilicon compound (B') utilized depends on the desired extent of cure, which generally increases as the ratio of the number of moles of silicon-bonded hydrolysable groups in the organosilicon compound (B') to the number of moles of silicon-bonded hydroxy groups in the organopolysiloxane (A') increases. The optimum amount of the organosilicon compound (B') can be readily determined by routine experimentation.

The condensation catalyst (C') can be any condensation catalyst typically used to promote condensation of silicon-bonded hydroxy (silanol) groups to form Si—O—Si linkages. Examples of condensation catalysts include, but are not limited to, amines, complexes of metals (e.g. lead, tin, zinc, iron, titanium, zirconium) with organic ligands (e.g. carboxyl, hydrocarbyl, alkoxyl, etc.) In particular embodiments, the condensation catalyst (C') can be selected from tin(II) and tin(IV) compounds such as tin dilaurate, tin dioctoate, dibutyltin dilaurate, dibutyltin diacetate, and tetrabutyl tin; and titanium compounds such as titanium tetrabutoxide. In these or other embodiments, the condensation catalyst (C') may be selected from zinc-based, iron-based, and zirconium-based catalysts.

The concentration of the condensation catalyst (C') is typically from 0.1 to 10% (w/w), from 0.5 to 5% (w/w), or from 1 to 3% (w/w), based on the total weight of the organopolysiloxane (A') in the condensation-curable silicone composition.

When the condensation-curable silicone composition includes the condensation catalyst (C'), the condensation-curable silicone composition is typically a two-part composition where the organopolysiloxane (A') and condensation catalyst (C') are in separate parts. In this embodiment, the organosilicon compound (B') is typically present along with the condensation catalyst (C'). Alternatively still, the condensation-curable silicone composition may be a three-part composition, where the organopolysiloxane (A'), the organosilicon compound (B') and condensation catalyst (C') are in separate parts.

Curing conditions for such condensation-curable silicone compositions may vary. For example, the condensation-curable silicone composition may be cured upon exposure to ambient conditions, a moisturized atmosphere, and/or heat.

In various embodiments, the silicone composition comprises or is a radiation-curable silicone composition, which may also be referred to as a free radical-curable silicone composition. The silicone article can be formed from such a composition.

In certain embodiments, including those under the second general embodiment, the acrylate composition is irradiated in the presence of the silicone composition. In these embodiments, irradiating the acrylate composition also cures the silicone composition simultaneously.

In certain embodiments, the radiation-curable silicone composition comprises (A") an organopolysiloxane having an average of at least two silicon-bonded radiation-curable groups and (C") a free radical initiator. In other embodiments, the radiation-curable silicone composition comprises (A") an organopolysiloxane having at least one silicon-bonded radiation-curable group; (B") a cross-linker; and (C") a free radical initiator.

The organopolysiloxane (A") may be linear, partially branched, branched, cyclic, or resinous (networked). In particular, the organopolysiloxane (A") may comprise any combination of M, D, T, and Q units, as with the organopolysiloxane (A) and the organosilicon compound (B) disclosed above.

The particular organopolysiloxane (A") may be selected based on desired properties of the silicone article or hybrid composition. For example, it may be desirable for the silicone article to be in the form of an elastomer, a gel, a resin, etc., and selecting the components of the silicone composition allows one of skill in the art to achieve a range of desirable properties.

In certain embodiments, the organopolysiloxane (A") comprises a silicone resin, which typically comprises T and/or Q units in combination with M and/or D units. When the organopolysiloxane (A") comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the radiation-curable silicone composition comprises a resin, the resulting silicone article or hybrid composition has increased rigidity.

Alternatively, in other embodiments, the organopolysiloxane (A") comprises repeating D units. Such organopolysiloxanes are substantially linear but may include some branching attributable to T and/or Q units. Alternatively, such organopolysiloxanes are linear. In these embodiments, the silicone article or resulting hybrid composition are elastomeric.

The silicon-bonded radiation-curable groups of the organopolysiloxane (A") may be pendent, terminal, or in both positions. The silicon-bonded radiation-curable groups may include, for example, ethylenic unsaturation in the form of double bonds and/or triple bonds. Exemplary examples of silicon-bonded radiation-curable groups include silicon-bonded alkenyl groups and silicon-bonded alkynyl groups. The radiation-curable groups may be bonded to silicon directly, or indirectly through a bridging group such as an alkylene group, an ether, an ester, an amide, or another group.

In specific embodiments, the organopolysiloxane (A") has the general formula:

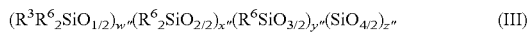

$$(R^3R^6{}_2SiO_{1/2})_{w''}(R^6{}_2SiO_{2/2})_{x''}(R^6SiO_{3/2})_{y''}(SiO_{4/2})_{z''} \quad (III)$$

wherein each $R^3$ is defined above and each $R^6$ is independently selected from $R^3$ and a radiation-curable group, with the proviso that at least two of $R^6$ are radiation-curable groups, and w", x", y", and z" are mole fractions such that w"+x"+y"+z"=1. As understood in the art, for linear organopolysiloxanes, subscripts y" and z" are generally 0, whereas for resins, subscripts y" and/or z">0. Various alternative embodiments are described below with reference to w", x", y" and z". In these embodiments, the subscript w" may have a value of from 0 to 0.9999, from 0 to 0.999, from 0 to 0.99, from 0 to 0.9, from 0.9 to 0.999, from 0.9 to 0.99, from 0.8 to 0.99, or from 0.6 to 0.99. The subscript x" typically has a value of from 0 to 0.9, from 0 to 0.45, or from 0 to 0.25. The subscript y" typically has a value of from 0 to 0.99, from 0.25 to 0.8, or from 0.5 to 0.8. The subscript z" typically has a value of from 0 to 0.99, from 0 to 0.85, from 0.85 to 0.95, from 0.6 to 0.85, from 0.4 to 0.65, from 0.2 to 0.5, from 0.1 to 0.45, from 0 to 0.25, or from 0 to 0.15.

The radiation-curable groups represented by $R^6$ may be the same as or different from one another. In various embodiments, the silicon-bonded radiation-curable groups of component (A") is/are independently selected from acryloyloxyalkyl groups, substituted acryloyloxyalkyl groups, alkenyl ether groups, alkenyl groups, acrylate functional groups, epoxy functional groups, alkynyl groups, thiol substituted organic groups, silicon hydride groups, and epoxy-substituted organic groups. Combinations of such groups can also be utilized. In general, acryloyloxyalkyl groups can include alkylacrylates groups, such as methacrylate.

The radiation-curable silicone composition can further comprise an unsaturated compound selected from: (i) at least one organosilicon compound having at least one silicon-bonded ethylenically unsaturated group per molecule; (ii) at least one organic compound having at least one aliphatic carbon-carbon double bond per molecule; (iii) at least one organosilicon compound having at least one silicon-bonded acryloyl group per molecule; (iv) at least one organic compound having at least one acryloyl group per molecule; or (v) mixtures comprising (i), (ii), (iii) and (iv). The unsaturated compound can have a linear, branched, or cyclic structure. The unsaturated compound may include radiation-curable groups other than ethylenically unsaturated groups, such as any of those set forth above.

The organosilicon compound can be an organosilane or an organosiloxane. The organosilane can be a monosilane, disilane, trisilane, or polysilane. Similarly, the organosiloxane can be a disiloxane, trisiloxane, or polysiloxane. Cyclosilanes and cyclosiloxanes typically have from 3 to 12 silicon atoms, from 3 to 10 silicon atoms, or from 3 to 4 silicon atoms. In acyclic polysilanes and polysiloxanes, the silicon-bonded ethylenically unsaturated group(s) can be located at terminal, pendant, or at both terminal and pendant positions.

Specific examples of organosilanes include, but are not limited to, silanes having the following formulae:

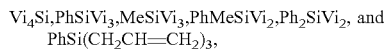

wherein Me is methyl, Ph is phenyl, and Vi is vinyl.

Specific examples of organosiloxanes include, but are not limited to, siloxanes having the following formulae:

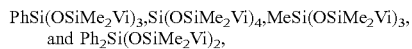

wherein Me is methyl, Vi is vinyl, and Ph is phenyl.

The organic compound can be any organic compound containing at least one aliphatic carbon-carbon double bond per molecule, provided the compound does not prevent the organopolysiloxane (A") from curing. The organic compound can be an alkene, a diene, a triene, or a polyene. Further, in acyclic organic compounds, the carbon-carbon double bond(s) can be located at terminal, pendant, or at both terminal and pendant positions.

The organic compound can contain one or more functional groups other than the aliphatic carbon-carbon double bond. Examples of suitable functional groups include, but are not limited to, —O—, >C═O, —CHO, —CO$_2$—, —C≡N, —NO$_2$, >C═C<, —C≡—, —F, —Cl, —Br, and —I. The suitability of a particular unsaturated organic compound for use in the radiation-curable silicone composition can be readily determined by routine experimentation.

Examples of organic compounds containing aliphatic carbon-carbon double bonds include, but are not limited to, 1,4-divinylbenzene, 1,3-hexadienylbenzene, and 1,2-diethenylcyclobutane.

The unsaturated compound can be a single unsaturated compound or a mixture comprising two or more different unsaturated compounds, each as described above. For example, the unsaturated compound can be a single organosilane, a mixture of two different organosilanes, a single organosiloxane, a mixture of two different organosiloxanes, a mixture of an organosilane and an organosiloxane, a single organic compound, a mixture of two different organic compounds, a mixture of an organosilane and an organic compound, or a mixture of an organosiloxane and an organic compound.

As introduced above, in other embodiments, the radiation-curable silicone composition comprises the organopolysiloxane having at least one, optionally at least two, silicon-bonded radiation-curable groups (A"); the cross-linker (B"); and the free radical initiator (C"). The cross-linker (B") can be the same as or different from the unsaturated compound described above. In various embodiments, the cross-linker (B") comprises an acrylate having at least two functional groups reactive with the silicon-bonded radiation-curable group(s) of the organopolysiloxane (A"). Examples of the cross-linker (B") include multifunctional acrylates. Specific examples of suitable multifunctional acrylates are described below for embodiments of the acrylate composition.

In specific embodiments, the radiation-curable silicone composition comprises an organopolysiloxane (A") of the general formula:

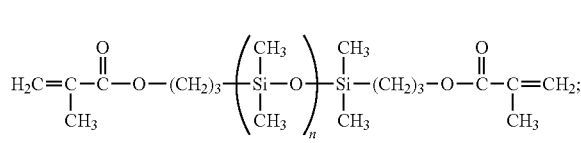

where n is an integer such that the average molecular weight of component (A") is from 100 to 50,000, from 1,000 to 25,000, from 5,000 to 15,000, from 7,500 to 12,500, or from 9,000 to 11,000, g/mol.

The free radical initiator (C") is a compound that produces a free radical, and is utilized to initiate polymerization of the organopolysiloxane (A"). Typically, the free radical initiator (C") produces a free radical via dissociation caused by irradiation, heat, and/or reduction by a reducing agent.

In various embodiments, the free radical initiator (C") is selected from any known free radical type photoinitiators effective for promoting crosslinking reactions. Examples of suitable photoinitiators include benzophenone, acetonaphthone, acetophenone, benzoin methyl ether, benzoin ethyl ether, benzoin isopropyl ether, benzoin isobutyl ether, 2-hydroxy-2-methylpropiophenone, 1-hydroxycyclohexylphenyl ketone, 2,2-diethoxyacetophenone, 3-hydroxypropylphenyl ketone, 3-hydroxypropyl-p-isopropylphenyl ketone, diethoxyxanthone, chloro-thioxanthone, azo-bisisobutyronitrile, N-methyl diethanolaminebenzophenone 4,4'-bis(dimethylamino)benzophenone, 2,2-dimethoxy-1,2-diphenylethan-1-one, 2-methyl-1-[4-(methylthio)phenyl]-2-morpholinopropan-1-one, 1-[4-(2-hydroxyethoxy)phenyl]-2-hydroxy-2-methyl-propan-1-one, 2-benzyl-2-dimethylamino-1-(4-morpholinophenyl)butan-1-one, bis(2,4,6-trimethylbenzoyl)phenylphosphine oxide, and combinations thereof.

In various embodiments, the free radical initiator (C") is comprises an azo compound or an organic peroxide compound. Suitable azo compounds include azobenzene, azobenzene-p-sulfonic acid, azobisdimethylvaleronitrile, azobisisobutyronitrile, and a combination thereof. Suitable organic peroxide compounds include dialkyl peroxides, diaryl peroxides, diacyl peroxides, alkyl hydroperoxides, and aryl hydroperoxides. Alternatively, the organic peroxide may be exemplified by benzoyl peroxide; dibenzoyl peroxide; 4-monochlorobenzoyl peroxide; dicumyl peroxide; tert-butylperoxybenzoate; tert-butyl cumyl peroxide; tert-butyloxide 2,5-dimethyl-2,5-di-tert-butylperoxyhexane; 2,4-dichlorobenzoyl peroxide; di-tertbutylperoxy-diisopropyl benzene; 1,1-bis(tert-butylperoxy)-3,3,5-trimethylcyclohexane; 2,5-di-tert-butylperoxyhexane-3,2,5-dimethyl-2,5-bis(tert-butylperoxy) hexane; cumyl-tert-butyl peroxide; or combinations of two or more thereof.

The free radical initiator (C") can be a single compound or a mixture comprising two or more different initiators. The concentration of the free radical initiator (C") is typically from 0.1 to 5% (w/w), or from 0.2 to 2% (w/w), based on the weight of the organopolysiloxane (A"). The radiation-curable silicone composition may be a two-part composition where the organopolysiloxane (A″) and the free radical initiator (C″) are in separate parts.

In various embodiments, the silicone composition comprises or is a ring opening reaction-curable. The silicone article can be formed from such a composition.

In certain embodiments, the ring opening reaction-curable silicone composition comprises (A‴) an organopolysiloxane having an average of at least two epoxy-substituted groups per molecule and (C‴) a curing agent. However, the ring opening reaction-curable silicone composition is not limited specifically to epoxy-functional organopolysiloxanes. Other examples of ring opening reaction-curable silicone compositions include those comprising silacyclobutane and/or benzocyclobutene.

The organopolysiloxane (A‴) may be linear, partially branched, branched, cyclic, or resinous (networked). In particular, the organopolysiloxane (A‴) may comprise any combination of M, D, T, and Q units, as with the organopolysiloxane (A) and the organosilicon compound (B) disclosed above.

The particular organopolysiloxane (A‴) may be selected based on desired properties of the silicone article or hybrid composition. For example, it may be desirable for the silicone article to be in the form of an elastomer, a gel, a resin, etc., and selecting the components of the silicone composition allows one of skill in the art to achieve a range of desirable properties.

In certain embodiments, the organopolysiloxane (A‴) comprises a silicone resin, which typically comprises T and/or Q units in combination with M and/or D units. When the organopolysiloxane (A‴) comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the resulting silicone article or hybrid composition has increased rigidity.

Alternatively, in other embodiments, the organopolysiloxane (A‴) comprises repeating D units. Such organopolysiloxanes are substantially linear but may include some branching attributable to T and/or Q units. Alternatively, such organopolysiloxanes are linear. In these embodiments, the resulting silicone article or hybrid composition are elastomeric.

The epoxy-substituted groups of the organopolysiloxane (A‴) may be pendent, terminal, or in both positions. "Epoxy-substituted groups" are generally monovalent organic groups in which an oxygen atom, the epoxy substituent, is directly attached to two adjacent carbon atoms of a carbon chain or ring system. Examples of epoxy-substituted organic groups include, but are not limited to, 2,3-epoxypropyl, 3,4-epoxybutyl, 4,5-epoxypentyl, 2-glycidoxyethyl, 3-glycidoxypropyl, 4-glycidoxybutyl, 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3 epoxycylopentyl)propyl.

In specific embodiments, the organopolysiloxane (A‴) has the general formula:

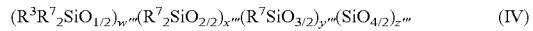

$$(R^3R^7{}_2SiO_{1/2})_{w'''}(R^7{}_2SiO_{2/2})_{x'''}(R^7SiO_{3/2})_{y'''}(SiO_{4/2})_{z'''} \quad (IV)$$

wherein each $R^3$ is defined above and each $R^7$ is independently selected from $R^3$ and an epoxy-substituted group, with the proviso that at least two of $R^7$ are epoxy-substituted groups, and w‴, x‴, y‴, and z‴ are mole fractions such that w‴+x‴+y‴+z‴=1. As understood in the art, for linear organopolysiloxanes, subscripts y‴ and z‴ are generally 0, whereas for resins, subscripts y‴ and/or z‴>0. Various alternative embodiments are described below with reference to w‴, x‴, y‴ and z‴. In these embodiments, the subscript w‴ may have a value of from 0 to 0.9999, from 0 to 0.999, from 0 to 0.99, from 0 to 0.9, from 0.9 to 0.999, from 0.9 to 0.99, from 0.8 to 0.99, or from 0.6 to 0.99, The subscript x‴ typically has a value of from 0 to 0.9, from 0 to 0.45, or from 0 to 0.25. The subscript y‴ typically has a value of from 0 to 0.99, from 0.25 to 0.8, or from 0.5 to 0.8. The subscript z‴ typically has a value of from 0 to 0.99, from 0 to 0.85, from 0.85 to 0.95, from 0.6 to 0.85, from 0.4 to 0.65, from 0.2 to 0.5, from 0.1 to 0.45, from 0 to 0.25, or from 0 to 0.15.

The curing agent (C‴) can be any curing agent suitable for curing the organopolysiloxane (A‴). Examples of curing agents (C‴) suitable for that purpose include phenolic compounds, carboxylic acid compounds, acid anhydrides, amine compounds, compounds containing alkoxy groups, compounds containing hydroxyl groups, or mixtures thereof or partial reaction products thereof. More specifically, examples of curing agents (C‴) include tertiary amine compounds, such as imidazole; quaternary amine compounds; phosphorus compounds, such as phosphine; aluminum compounds, such as organic aluminum compounds; and zirconium compounds, such as organic zirconium compounds. Furthermore, either a curing agent or curing catalyst or a combination of a curing agent and a curing catalyst can be used as the curing agent (C‴). The curing agent (C‴) can also be a photoacid or photoacid generating compound.

The ratio of the curing agent (C‴) to the organopolysiloxane (A‴) is not limited. In certain embodiments, this ratio is from 0.1 to 500 parts by weight of the curing agent (C‴) per 100 parts by weight of the organopolysiloxane (A‴).

In various embodiments, the silicone composition comprises or is a thiol-ene curable silicone composition. The silicone article can be formed from such a composition.

In certain embodiments, the thiol-ene curable silicone composition comprises: (A″″) an organopolysiloxane having an average of at least two silicon-bonded ethylenically unsaturated groups or silicon-bonded mercapto-alkyl groups per molecule; (B″″) an organosilicon compound having an average of at least two silicon-bonded mercapto-alkyl groups or silicon-bonded ethylenically unsaturated groups per molecule capable of reacting with the silicon-bonded ethylenically unsaturated groups or silicon-bonded mercapto-alkyl groups in the organopolysiloxane (A″″); (C″″) a catalyst; and (D″″) an optional organic compound containing two or more mercapto groups. When the organopolysiloxane (A″″) includes silicon-bonded ethylenically unsaturated groups, the organosilicon compound (B″″) and/or the organic compound (D″″) include at least two mercapto groups per molecule bonded to the silicon and/or in the organic compound, and when the organopolysiloxane (A″″) includes silicon-bonded mercapto groups, the organosilicon compound (B″″) includes at least two silicon-bonded ethylenically unsaturated groups per molecule. The organosilicon compound (B″″) and/or the organic compound (D″″) may be referred to as a cross-linker or cross-linking agent.

The catalyst (C″″) can be any catalyst suitable for catalyzing a reaction between the organopolysiloxane (A″″) and the organosilicon compound (B″″) and/or the organic compound (D″″). Typically, the catalyst (C″″) is selected from: i) a free radical catalyst; ii) a nucleophilic reagent; and iii) a combination of i) and ii). Suitable free radical catalysts for use as the catalyst (C″″) include photo-activated free radical catalysts, heat-activated free radical catalysts, room temperature free radical catalysts such as redox catalysts and alkylborane catalysts, and combinations thereof. Suitable nucleophilic reagents for use as the catalyst (C'''') include amines, phosphines, and combinations thereof.

In various embodiments, the silicone composition comprises or is a silicon hydride-silanol reaction curable silicone composition. The silicone article can be formed from such a composition.

In certain embodiments, the silicon hydride-silanol reaction curable silicone composition comprises: (A'''') an organopolysiloxane having an average of at least two silicon-bonded hydrogen atoms or at least two silicone bonded hydroxyl groups per molecule; (B'''') an organosilicon compound having an average of at least two silicon-bonded hydroxyl groups or at least two silicon bonded hydrogen atoms per molecule capable of reacting with the silicon-bonded hydrogen atoms or silicon-bonded hydroxyl groups in the organopolysiloxane (A''''); (C'''') a catalyst; and (D'''') an optional active hydrogen containing compound. When the organopolysiloxane (A'''') includes silicon-bonded hydrogen atoms, the organosilicon compound (B'''') and/or the organic compound (D'''') include at least two hydroxyl groups per molecule bonded to the silicon and/or in the active hydrogen containing compound, and when the organopolysiloxane (A'''') includes silicon-bonded hydroxyl groups, the organosilicon compound (B'''') includes at least two silicon-bonded hydrogen atoms per molecule. The organosilicon compound (B'''') and/or the organic compound (D'''') may be referred to as a cross-linker or cross-linking agent.

Typically, the catalyst (C'''') is selected from: i) a Group X metal-containing catalyst such as platinum; ii) a base such as metal hydroxide, amine, or phosphine; and iii) combinations thereof.

As introduced above, the acrylate composition comprises an acrylate compound having the general formula (A):

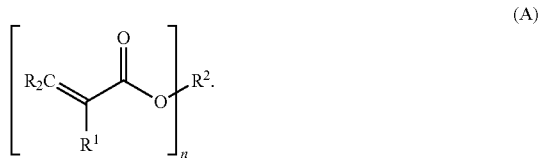

(A)

In formula (A), each R is independently selected from H and substituted or unsubstituted hydrocarbyl groups, $R^1$ is H or a substituted or unsubstituted hydrocarbyl group having from 1 to 10 carbon atoms, n is an integer equal to or greater than 1, and $R^2$ is selected from $R^1$, an amine group, an alkyl group, an alkyl group substituted with a hydroxyl group or an amino group, or a moiety having a valency of n greater than 1 to 4.

In certain embodiments, each R is an independently selected substituted or unsubstituted hydrocarbyl group having from 1 to 10, from 1 to 8, from 1 to 6, from 1 to 4, 1 or 2, or 1, carbon atom(s). In other embodiments, at least one R is a substituted or unsubstituted hydrocarbyl group, and the other R is H. In yet other embodiments, each R is H.

In certain embodiments, $R^1$ is H. In other embodiments, $R^1$ is a substituted or unsubstituted hydrocarbyl group having from 1 to 10 carbon atoms. Examples of suitable substituted or unsubstituted hydrocarbyl groups for $R^1$ of the acrylate compound are the same as described above for $R^3$ of the silicone composition. In various embodiments, $R^1$ is an alkyl group, e.g. methyl.

$R^2$ can be the same as or different from $R^1$. Suitable alkyl groups for $R^2$ include those described above for $R^3$. The alkyl group of $R^2$ can be optionally substituted, e.g. with a hydroxyl group or an amino group. In certain embodiments, $R^2$ is an alkoxy group, such as methoxy, ethoxy, propoxy or butoxy. In other embodiments, $R^2$ is an amine group. Further still, $R^2$ can be a moiety having a valency of greater than 1, e.g. a silicon atom. When $R^2$ is the moiety having a valency of greater than 1, the acrylate compound is a multi-functional acrylate, e.g. a di-functional acrylate, a tri-functional acrylate, or a tetra-functional acrylate.

In various embodiments, subscript n is 1. In other embodiments, n is greater than 1. In certain embodiments, n is from 1 to 4, is 1 or 2, or is 1. The moiety having a valency of n greater than 1 can comprise one or more atoms, e.g. a carbon atom, and may be a pre-polymer or oligomer.

As such, the acrylate compound can be mono or multi-functional. Examples of suitable multifunctional acrylates are commercially available from Sartomer, Arkema, and Miwon. In certain embodiments, the acrylate composition comprises at least one monofunctional acrylate, at least one multifunctional acrylate (i.e., having two or more functional groups), or combinations thereof.

In various embodiments, the acrylate compound of the acrylate composition is selected from the group of acrylates, acrylamides, amino-substituted acrylates, hydroxy-substituted acrylates, and combinations thereof. In certain embodiments, the acrylate composition further comprises acrylic acid. In other embodiments, the acrylate composition is substantially to completely free of acrylic acid.

Specific examples of compounds suitable for use as the acrylate compound generally include methyl (meth)acrylate, ethyl (meth)acrylate, n-propyl (meth)acrylate, iso-propyl (meth)acrylate, n-butyl (meth)acrylate, iso-butyl (meth) acrylate, sec-butyl (meth)acrylate, and tert-butyl (meth) acrylate, methyl acrylate, ethyl acrylate, n-propyl acrylate, iso-propyl acrylate, n-butyl acrylate, iso-butyl acrylate, sec-butyl acrylate, and tert-butyl acrylate. In certain embodiments, the acrylate compound is selected from methyl (meth)acrylate, ethyl (meth)acrylate, and n-butyl (meth) acrylate. In some embodiments, the acrylate compound is selected from methyl acrylate, ethyl acrylate, and n-butyl acrylate. In specific embodiments, the acrylate compound is methyl (meth)acrylate (MMA).

Further specific examples of compounds suitable for use as the acrylate compound generally include hydroxyethyl acrylamide, N-isopropyl acrylamide, 2-hydroxyethyl methacrylate, 2-hydroxyethyl acrylate, methacrylamide, N,N'-dimethylaminoacrylamide, t-butylacrylamide, t-octylacrylamide, dimethylaminopropyl methacrylamide, dimethylaminoethyl methacrylamide, dimethylaminopropyl acrylamide, dimethylaminoethyl acrylamide, N,N-bis-(dimethylaminoethyl) methacrylamide, N,N-bis-(dimethylaminopropyl) acrylamide, N,N-bis-(dimethylaminoethyl) acrylamide, and N,N-bis-(dimethylaminopropyl) methacrylamide; amino-substituted acrylates and methacrylates such as dimethylaminoethyl methacrylate, dimethylaminopropyl methacrylate, dimethylaminoethyl acrylate and dimethylaminopropyl acrylate; hydroxyalkyl acrylates and methacrylates such as hydroxyethyl acrylate, hydroxyethyl methacrylate, hydroxypropyl methacrylate and hydroxypropyl acrylate. Combinations of two or more compounds may also be used as the acrylate compound.

The acrylate compound may be utilized in any form, such as neat (i.e., absent solvents, carrier vehicles, diluents, etc.), or disposed in a carrier vehicle, such as a solvent or dispersant. The carrier vehicle, if present, may comprise or be an organic solvent (e.g. aromatic hydrocarbons such as benzene, toluene, xylene, etc.; aliphatic hydrocarbons such as heptane, hexane, octane, etc.; halogenated hydrocarbons such as dichloromethane, 1,1,1-trichloroethane, chloroform; etc.; ethers such as diethyl ether, tetrahydrofuran, etc., alcohols such as methanol, ethanol, etc.), a silicone fluid, an aqueous solvent (e.g. water), or combinations thereof.

In certain embodiments, the acrylate composition is free from, or substantially free from, carrier vehicles. In some such embodiments, the acrylate composition is free from, or substantially free from, water and carrier vehicles/volatiles reactive with other components present. For example, in certain embodiments, the method may comprise stripping the acrylate composition of volatiles and/or solvents (e.g. water, organic solvents such as alcohols, ethers, etc.). Techniques for stripping the acrylate composition are understood in the art, and may include distillation, heating, applying reduced pressure/vacuum, azeotroping with solvents, utilizing molecular sieves, etc., and combinations thereof.

The initiator is a compound that produces a free radical, and is utilized to initiate polymerization of the acrylate composition. In certain embodiments, the initiator is also utilized to initiate polymerization of the silicone composition. Typically, the initiator produces a free radical via dissociation caused by irradiation, heat, and/or reduction by a reducing agent.

In various embodiments, the initiator is selected from any known free radical type photoinitiators effective for promoting crosslinking reactions. Examples of suitable photoinitiators include benzophenone, acetonaphthone, acetophenone, benzoin methyl ether, benzoin ethyl ether, benzoin isopropyl ether, benzoin isobutyl ether, 2-hydroxy-2-methylpropiophenone, 1-hydroxycyclohexylphenyl ketone, 2,2-diethoxyacetophenone, 3-hydroxypropylphenyl ketone, 3-hydroxypropyl-p-isopropylphenyl ketone, diethoxyxanthone, chloro-thioxanthone, azo-bisisobutyronitrile, N-methyl diethanolaminebenzophenone 4,4'-bis(dimethylamino)benzophenone, 2,2-dimethoxy-1,2-diphenylethan-1-one, 2-methyl-1-[4-(methylthio)phenyl]-2-morpholinopropan-1-one, 1-[4-(2-hydroxyethoxy)phenyl]-2-hydroxy-2-methyl-propan-1-one, 2-benzyl-2-dimethylamino-1-(4-morpholinophenyl)butan-1-one, bis(2,4,6-trimethylbenzoyl) phenylphosphine oxide, and combinations thereof.

In various embodiments, the initiator comprises an azo compound or an organic peroxide compound. Suitable azo compounds include azobenzene, azobenzene-p-sulfonic acid, azobisdimethylvaleronitrile, azobisisobutyronitrile, and a combination thereof. Suitable organic peroxide compounds include dialkyl peroxides, diaryl peroxides, diacyl peroxides, alkyl hydroperoxides, and aryl hydroperoxides. Alternatively, the organic peroxide may be exemplified by benzoyl peroxide; dibenzoyl peroxide; 4-monochlorobenzoyl peroxide; dicumyl peroxide; tert-butylperoxybenzoate; tert-butyl cumyl peroxide; tert-butyloxide 2,5-dimethyl-2,5-di-tert-butylperoxyhexane; 2,4-dichlorobenzoyl peroxide; di-tertbutylperoxy-diisopropyl benzene; 1,1-bis(tert-butylperoxy)-3,3,5-trimethylcyclohexane; 2,5-di-tert-butylperoxy-hexane-3,2,5-dimethyl-2,5-bis(tert-butylperoxy) hexane; cumyl-tert-butyl peroxide; or combinations of two or more thereof.

The initiator can be a single compound or a mixture comprising two or more different initiators. The concentration of the initiator is typically from 0.1 to 5% (w/w), or from 0.2 to 2% (w/w), based on the weight of the acrylate composition.

In various embodiments, as least one of the silicone article, silicone composition, or acrylate composition comprises and/or is formed in the presence of at least one additive. The additive can be selected from conventional additives known in the art. Examples of suitable additives include, but are not limited to, reaction (or polymerization) inhibitors, solvents, fillers, stabilizers, etc.

In certain embodiments, the acrylate composition is irradiated in the presence of a polymerization inhibitor. The polymerization inhibitor is not limited, and may comprise, or may be, a radical scavenger, an antioxidant, a light stabilizer, a UV-absorber, or the like, or a combination thereof. Such compounds are known in the art, and generally are, or include, a chemical compound or moiety capable of interacting with a free radical to render the free radical inactive, e.g. via elimination the free radical through the formation of a covalent bond therewith. The polymerization inhibitor may also comprise, or be, a polymerization retardant, i.e., a compound that reduces the rate of initiation and/or propagation of a radical polymerization. For example, in some embodiments, the polymerization inhibitor comprises, or is, oxygen gas. In general, the polymerization inhibitor is utilized to prevent and/or suppress the formation of byproducts that may be formed via radical polymerization of certain acrylate compounds and/or acryloxy-functional organosilicon compounds.

The polymerization inhibitor is not limited, and may comprise, alternatively may be, a phenolic compound, a quinone or hydroquinone compound, an N-oxyl compound, a phenothiazine compound, a hindered amine compound, or a combination thereof. Other compounds suitable for use in or as the polymerization inhibitor include phenothiazine (PTZ) and compounds with similar structures, such as phenoxazine, promazine, N,N'-dimethylphenazine, carbazole, N-ethylcarbazole, N-benzylphenothiazine, N-(1-phenylethyl)phenothiazine, N-Alkylated phenothiazine derivatives such as N-benzylphenothiazine and N-(1-phenylethyl) phenothiazine, and the like. Other suitable polymerization inhibitors include, for example, an alkyne alcohol such as 2-methyl-3-butyn-2-ol, 3,5-dimethyl-1-hexyn-3-ol, or 2-phenyl-3-butyn-2-ol; an ene-yne compound such as 3-methyl-3-penten-1-yne or 3,5-dimethyl-3-hexen-1-yne; or 1,3,5,7-tetramethyl-1,3,5,7-tetravinylcyclotetrasiloxane, 1,3,5,7-tetramethyl-1,3,5,7-tetrahexenylcyclotetrasiloxane, or a benzotriazole. Of course, the polymerization inhibitor may include any number of particular compounds, which may each be independently selected and the same as or different from any other compound of the polymerization inhibitor.

If utilized, the polymerization inhibitor may be added to the reaction as a discrete component, or may be combined with another component (e.g. the acrylate composition prior to irradiation). The polymerization inhibitor may be utilized in any amount, which will be selected by one of skill in the art, e.g. dependent upon the particular polymerization inhibitor selected, the reaction parameters employed, the scale of the reaction (e.g. total amount of the acrylate composition), the atmosphere of the reaction, the temperature and/or pressure of the reaction, etc. In certain embodiments, the polymerization inhibitor is present in an amount of from 50 to 2,000 ppm based on the total amount of acrylate composition.

Exemplary embodiments are described below. Further embodiments can be appreciated with reference to the Examples below.

In an example of the first general embodiment, the silicone article is provided, which can be pre-formed (e.g. provided commercially) or prepared. In certain embodiments, the method comprises preparing the silicone article. For example, the silicone article can be prepared from one or more of the silicone compositions described above. Conventional methods of formation are understood by those of ordinary skill in the art.

The acrylate composition and initiator are provided. These components can be provided together or separate from one another. In various embodiments, these components are first combined to form a solution. The solution can be homogenous or heterogeneous.

The silicone article and the solution (and/or the separate components thereof) can be combined in any order, and the silicone article is infused and swollen by the acrylate composition to form a swollen silicone material. The acrylate composition is generally dispersed throughout the silicone article.

The silicone article and acrylate composition can be combined in various amounts. In various embodiments, silicone article and acrylate composition are combined in a mass ratio of from 1:10 to 10:1, from 1:9 to 9:1, from 1:8 to 8:1, from 1:7 to 7:1, from 1:6 to 6:1, from 1:5 to 5:1, from 1:4 to 4:1, from 1:3 to 3:1, from 1:2 to 2:1, or 1:1.

The silicone material can be allowed to swell at room (e.g. 23±2° C.) or elevated temperature. Swelling can occur over a period of time until reaching stable equilibrium. The time period can vary, and may range from 1 to 120, from 30 to 90, from 45 to 75, or from 55 to 65, minutes.

The swollen silicone material can for formed and/or subsequently placed in a confined and optionally inert environment (e.g. in a vessel or reactor purged with nitrogen gas). If an elevated temperature is utilized, the vessel or reactor may be heated in any suitable manner, e.g. via a jacket, heating mantle, hotplate, coils, etc.

Additional acrylate composition may be introduced, e.g. via a gaseous or liquid stream. Such introduction may be useful to obviate or prevent evaporation effects. In certain embodiments, the vessel or reactor can be pressurized to facilitate swelling of the silicone article and/or reduce or prevent evaporation of certain components.

The swollen silicone material is then irradiated. For example, the swollen silicone material is exposed to UV-radiation to polymerize the acrylate composition and form the acrylate polymer in-situ. Excess acrylate composition may be removed from the swollen silicone article beforehand, e.g. to prevent outer skin formation thereon during cure. Irradiation and polymerization of the acrylate composition in the swollen silicone material forms the silicone-acrylate hybrid composition.

Irradiation can be implemented by methodologies understood in the art. In various embodiments, the acrylate composition is irradiated (and thus cured) by irradiation of ultraviolet (UV) light. For example, low pressure, high pressure or ultrahigh pressure mercury lamp, metal halide lamp, (pulse) xenon lamp, or an electrodeless lamp is useful as an UV lamp. The irradiation dose can vary. In certain embodiments, the irradiation dose is in a range of from 5 to about 6,000 $mJ/cm^2$, or in a range of from about 10 to about 4,000 $mJ/cm^2$.

In some embodiments, at least one of the components includes a carrier vehicle or solvent. In other embodiments, irradiation is carried out in in the absence of any carrier vehicle or solvent. For example, no carrier vehicle or solvent may be combined discretely with the silicone article, the acrylate composition, etc. In these or other embodiments, none of the components are disposed in any carrier vehicle or solvent, such that no carrier vehicle or solvent is present during polymerization of the acrylate composition.

Optionally, the hybrid composition can be exposed to a vacuum, a sweep gas, or a combination of both, to remove volatiles. For example, in embodiments where the acrylate composition comprises MMA, vacuum can be applied to remove residual material.

In an example of the second general embodiment, the silicone composition, acrylate composition, and initiator are combined in a single liquid solution. The components can be combined using conventional techniques and held, for example, in a vessel or reactor.

In many embodiments, the silicone composition comprises, or is, the radiation-curable silicone composition. In these embodiments, the radiation-curable silicone composition comprises the organopolysiloxane having at least one, optionally at least two, silicon-bonded radiation-curable group(s) (A"); optionally the cross-linker (B"); and the free radical initiator (C").

In specific embodiments, the radiation-curable silicone composition comprises the organopolysiloxane having at least two silicon-bonded radiation-curable groups (A"); and the free radical initiator (C"). Examples of such components are as disclosed above with description of the silicone composition. In other embodiments, the silicone composition comprises, or is, the hydrosilylation-curable silicone composition.

The silicone composition and acrylate composition can be combined in various amounts. In various embodiments, the silicone and acrylate compositions are combined in a volume ratio of from 1:10 to 10:1, 1:9 to 9:1, 1:8 to 8:1, 1:7 to 7:1, 1:6 to 6:1, 1:5 to 5:1, 1:4 to 4:1, 1:3 to 3:1, 1:2 to 2:1, or 1:1. In further embodiments, the organopolysiloxane (A") and acrylate composition are combined in a volume ratio of from 1:10 to 10:1, 1:9 to 9:1, 1:8 to 8:1, 1:7 to 7:1, 1:6 to 6:1, 1:5 to 5:1, 1:4 to 4:1, 1:3 to 3:1, 1:2 to 2:1, or 1:1. The ratio of the silicone composition and acrylate composition is selected based on those compositions utilized, as well as the desired properties of the hybrid composition and end use applications thereof. In certain embodiments, it may be desirable to have an excess of the silicone article in the hybrid composition, whereas in other embodiments, it may be desirable to have an excess of the acrylate polymer in the hybrid composition.

The solution is then irradiated to polymerize the silicone and acrylate compositions simultaneously. Other methods of curing, like the application of heat, may be utilized in combination with irradiation, particularly if the silicone-composition is heat curable, e.g. if the silicone-composition comprises the hydrosilylation-curable silicone composition. This forms a silicone-acrylate hybrid composition. Irradiation can be implemented as like described above. Optionally, the hybrid composition can be exposed to a vacuum after formation to remove volatiles.

A composite article is also provided. The composite article comprises the silicone-acrylate hybrid composition. In various embodiments, the composite article comprises the hybrid composition disposed on a substrate. In certain embodiments, the hybrid composition is sandwiched between at least two substrates, which may be the same as or different from one another. The hybrid composition may be directly formed on the substrate or formed separate from, and later applied to, the substrate. The present disclosure is not limited to a particular material type or geometry of substrate. In specific embodiments, at least one substrate is conventional to electronic devices or parts thereof.

In various embodiments, the substrate comprises an electronic device. The present disclosure is not limited to a particular electronic device. A specific example of an electronic device is a circuit board. The circuit board or electronic device is not limited and may be, for example, utilized in the automotive industry, control modules, consumer applications and appliances, computers, mobile phones, etc.

In certain embodiments, the hybrid composition is utilized as a conformal coating. Without being bound or limited by any particular theory, it is thought that the hybrid composition provides excellent properties relative to conventional conformal coatings. For example, the silicone aspects of the hybrid composition provides excellent optical clarity (which can ease inspection) and the acrylate aspects of the hybrid composition provides excellent mechanical properties, such as rigidity, toughness, etc.

As understood in the art, conformal coatings can be used to conform to the contours of a printed circuit board to protect the board's components. Such coatings can be applied at various thicknesses, such as from 25 to 250 μm (micrometers) in average thickness. Conformal coatings applied to electronic circuitry generally help to protect against moisture, dust, chemicals, and temperature extremes.

In these embodiments, the hybrid composition can be applied in a number of ways, including brushing, spraying, dispensing, dip coating, etc. In certain embodiments, the hybrid composition includes are least one colorant (e.g. a fluorescent dye) to aid in coating coverage inspection.

In other embodiments, the hybrid composition is used as or in an adhesive composition. The adhesive composition can be utilized in a number of applications, and this disclosure is not limited to a particular one. For example, the adhesive composition may be utilized in optical clear resins, which are often utilized in displays, camera modules, image sensor bonding, mini/micro LEDs, smart watches, etc.

The following examples, illustrating embodiments of this disclosure, are intended to illustrate and not to limit the invention. The working examples generally fall under the first general embodiment and the second general embodiment of the invention method as described above. Certain components used in the examples are set forth in Table 1 below.

TABLE 1

Components

| Component | Chemical Description |
|---|---|
| Organopolysiloxane 1 | Vinyl-terminated linear polydimethylsiloxane (PDMS) with a molecular weight of 9,400 g/mol |
| Organopolysiloxane 2 | Methacryloxypropyl-terminated PDMS with a molecular weight of 10,000 g/mol |
| Organosilicon compound | Trimethylsiloxy terminated methylhydrosiloxane-dimethylsiloxane copolymer with 25 to 35 mole % of hydride groups |
| Hydrosilylation catalyst | Karstedt's catalyst: Platinum-divinyltetramethyl-disiloxane complex; 2% platinum (Pt) in xylene |
| MMA | Methyl methacrylate monomers; 99%, <30 parts per million (ppm) of 4-methyoxyphenol (MEHQ) |
| PMMA | Polymethyl methacrylate |
| Photoinitiator | 2-Hydroxy-2-methyl propiophenone |
| Reaction Inhibitor | 2-methyl-3-butyn-2-ol |
| Solvent | Acetonitrile (anhydrous, 99.8%) |

First General Method

Organopolysiloxane 1 is combined with the organosilicon compound to form a mixture. The mixture is cured using increased temperature and the hydrosilylation catalyst to form an initial silicone network, which may also be referred to as a silicone article.

Next, a solution of MMA and 1 weight % (wt %) of the photoinitiator is provided. The silicone article and the solution are combined, and the silicone article is infused and swollen by the solution to form a swollen silicone material.

The swollen silicone material is then placed in a confined and inert environment and exposed to UV-radiation to polymerize PMMA (from the MMA) in-situ. This forms a silicone-acrylate hybrid composition.

Depending, for example, on the amount of silicone and PMMA formed or present, the hybrid compositions can have qualities that range from pure PDMS (e.g. elastic, rubbery, etc.) to higher PMMA content (e.g. higher in modulus and toughness, e.g. more leathery). In addition, optical transparency can be retained to a reasonable degree towards 50% PMMA mass fraction, for instance, with a slight blue tint in color. Optical transparent can be measured in accordance with ASTM D1003-13.

Comparative Example 1: Preparation of Silicone Article

A silicone formulation is initially prepared in a two-part (Part A and Part B) mixture for later combination in a 1:1 mass ratio. Part A consists of 8.66 grams (g) of organopolysiloxane 1, 1.34 g of the organosilicon compound, and 0.01 g of the reaction inhibitor. Part B consists of 10.00 g of organopolysiloxane 1 and 0.178 g of the diluted catalyst. The diluted catalyst is the hydrosilylation catalyst further diluted to a 5 wt. % solution in p-xylene to give a Pt content of 1,000 ppm.

Each part is mixed in a Flaktek speedmixer at 2,500 rotations per minute (rpm) for 1 minute after each new component is added. 3.00 g of each part is then added to a third speedmixer cup and immediately mixed together at 2,500 rpm for 1 minute. 5 g of this combined mixture is then transferred to a 10 centimeter (cm) diameter circular polystyrene petri dish and allowed to evenly spread before being placed in an oven set to 75° C. for 2 hours.

The sample is then removed from the oven, and tweezers are used to remove cross-linked PDMS from the petri dish. Next, the resulting circular PDMS sheet is cut with a razor blade to either 20×20 millimeter (mm) square samples, or in some cases are cut into 45×45 mm square samples.

Practical Examples 1 to 4

The aforementioned samples are used to form different hybrid compositions in Examples 1 to 4 below. In these examples, different amounts of PMMA are formed in-situ to prepare different interpenetrating polymer networks (IPNs) of PMMA and silicone article. Specifically, samples of the silicone article formed in Comparative Example 1 are submerged in different volume/volume solutions of MMA and solvent respectively with 1 wt % of photoinitiator. Each of the submerged samples is allowed to swell at room temperature (RT) until reaching stable equilibrium (at least 1 hour).

TABLE 2

| In-situ IPN Formation | | |
|---|---|---|
| Example Number | % PMMA IPN | MMA:solvent (volume/volume) |
| 1 | 15 | 60:40 |
| 2 | 30 | 80:20 |
| 3 | 39 | 90:10 |
| 4 | 50 | 100:0 |

After reaching stable equilibrium, each of the submerged samples is removed from solution with tweezers, excess solution is removed from the sample surface with a Kim wipe, and the sample is placed between two glass slides and clamped together. This is done quickly and efficiently to minimize evaporation losses of MMA from the sample.

The "sandwiched" sample is then placed in an enclosed chamber with quartz glass top. Nitrogen gas bubbled through MMA is allowed to flow through the chamber for 5 minutes before UV-radiation exposure. A 375 nanometer (nm) UV-radiation lamp (LEDD1B) from Thorlabs Inc. is used and held at a distance of 10 cm from the sample by placing it on top of the quartz top of the chamber. The sample is exposed to UV light for 1 hour while exposed to continuous flow of MMA-saturated nitrogen gas.

After curation, the sample is removed from the chamber and carefully separated from the glass slides. The edges of the sample are trimmed from the sample using a razor blade due to edge effects from evaporation. The resulting sample is then exposed to a vacuum of −30 inch of mercury (inHg) at RT for 1 hour to remove any remaining MMA.

Second General Method

Organopolysiloxane 2, MMA, and 1 wt. % of the photoinitiator are combined in a single liquid solution and then cured using UV-radiation to polymerize both components simultaneously. This forms a silicone-acrylate hybrid composition. Depending, for example, on the amount and/or type of components, the hybrid compositions can have an opaque or translucent white color. In addition, a similar range of mechanical properties as described in the First General Method above can be achieved.

Comparative Example 2: Preparation of 100% PDMS Elastomer

A stock solution of 3.0 milliliters (mL) of organopolysiloxane 2 and 0.03 mL of the photoinitiator is prepared to provide a 100% PDMS sample.

Practical Examples 5 to 9

Different IPN samples are prepared by stock solutions having different amounts of organopolysiloxane 2 and different amounts of MMA. The stock solutions also have photoinitiator.

TABLE 3

| Simultaneous/"One-Pot" IPN Formation | | | | | |
|---|---|---|---|---|---|
| Example Number | 5 | 6 | 7 | 8 | 9 |
| % PDMS:% PMMA IPN | 90:10 | 80:20 | 70:30 | 60:40 | 50:50 |
| Organopolysiloxane 2 (mL) | 2.7 | 2.4 | 2.1 | 1.8 | 1.5 |
| MMA (mL) | 0.3 | 0.6 | 0.9 | 1.2 | 1.5 |
| Photoinitiator (mL) | 0.03 | 0.03 | 0.03 | 0.03 | 0.03 |

To cure each of the samples, the premixed solution is sandwiched between two, 1 mm glass slides that are clamped together with a 1 mm thick Teflon spacer in between. The sandwiched sample is then placed under a UV lamp with a 375 nm wavelength and cured at an intensity of 1.7 milliWatts (mW/cm$^2$) for 30 minutes. After curing, a razor blade is used to remove a 1 mm thick sample.

Mechanical Characterization Procedure for Examples

20×20 mm square samples with a target thickness of 1 mm are used for mechanical characterization. Calipers are used to measure sample width and thickness which are then recorded for each sample.

Samples are loaded into a tensile loading setup with a TA Instruments Electroforce force transducer. Parallel clamps are used to grip the square samples such that the gauge length is approximately 4 mm in height, at which point the instrument is adjusted such that the samples are brought to a pre-loaded tensile force of 0.05 Newton (N). The new gauge length is then recorded based on the position offset from the pre-loading procedure. Two tests are performed on each of the samples, with identical programs.

Specifically, samples are extended at a displacement rate of 10 mm/min up to a final displacement of 2 mm, at which position the samples are then held for 30 seconds. Force and displacement values are recorded by the instrument during this procedure and exported as .csv files. Engineering strain is calculated based off of the initial gauge length (~4 mm) of the pre-loaded sample and the current displacement at any given point in time. Engineering stress is calculated based off of the force reading and the initial cross-sectional area from the originally determined thickness and width of the sample.

First, the above test is performed on a pristine sample. Secondly, the sample (assuming no fracture has occurred) is placed back into the clamp, and a notch is introduced perpendicular to the loading direction after the pre-loading procedure. This is done using a disposable steel razor blade, and the crack is made to be at least 2 mm long and centered along the height of the sample. The sample is then extended again using the same procedure, and fracture of the sample is observed as the crack started to propagate.

From this second test, the critical strain value is obtained from the load vs displacement curve by finding the strain value at which the load starts to decrease (indicating when the crack starts to propagate and fracture begins to occur). From the first (un-notched) test, the Young's modulus is calculated using the initial slope of the stress vs strain curve. Lastly, the fracture energy is calculated by assuming that the "pure shear" geometry used allows the following calculation to be valid:

$$\Gamma = 2\ h_0 \int_0^{\epsilon^*} \sigma(\epsilon) d\epsilon$$

where $\Gamma$ is the fracture energy in units of J/m$^2$, 2 $h_0$ is the initial gauge length of the notched test, $\epsilon^*$ is the critical strain value from the notched test, and $\sigma(\epsilon)$ is the stress vs strain curve from the un-notched test.

TABLE 4

| | Mechanical Properties | | | | | | |
|---|---|---|---|---|---|---|---|
| Example | PMMA Mass Fraction | Young's Modulus, E (MPa) | Std. Dev. | Critical Strain, $\epsilon^*$ | Std. Dev. | Fracture Energy, $\Gamma$ (J/m$^2$) | Std. Dev. |
| Comp. Ex. 1 | 0% | 1.1 | 0.0 | 0.17 | 0.03 | 57 | 23 |
| Example 1 | 15% | 1.5 | 0.0 | 0.13 | 0.01 | 49 | 4 |
| Example 2 | 30% | 3.2 | 0.3 | 0.16 | 0.01 | 136 | 7 |

TABLE 4-continued

Mechanical Properties

| Example | PMMA Mass Fraction | Young's Modulus, E (MPa) | Std. Dev. | Critical Strain, ε* | Std. Dev. | Fracture Energy, Γ (J/m²) | Std. Dev. |
|---|---|---|---|---|---|---|---|
| Example 3 | 39% | 8.2 | 0.2 | 0.19 | 0.00 | 446 | 12 |
| Example 4 | 50% | 45.7 | 2.9 | 0.13 | 0.02 | 1258 | 75 |
| Comp. Ex. 2 | 0% | 1.7 | 0.1 | 0.11 | 0.01 | 39 | 12 |
| Example 5 | 10% | 2.6 | 0.2 | 0.12 | 0.01 | 66 | 9 |
| Example 6 | 20% | 2.9 | 0.8 | 0.12 | 0.01 | 73 | 16 |
| Example 7 | 30% | 8.4 | 3.3 | 0.14 | 0.02 | 208 | 140 |
| Example 8 | 40% | 7.3 | 3.5 | 0.13 | 0.01 | 186 | 109 |
| Example 9 | 50% | 24.9 | 4.5 | 0.13 | 0.01 | 622 | 63 |

As described and illustrated herein, this disclosure provides a method of producing hybrid compositions (e.g. silicone-organic elastomer materials) that offer substantial (e.g. up to over 20×) increases in elastic modulus and fracture toughness relative to pure silicone elastomers. Without being bound or limited by any specific theory, it is thought that these beneficial properties are achieved by limiting the length scale of phase separation. It is also believed that this provides a high degree of optical transparency. In addition, the hybrid composition is composed of otherwise immiscible polymers with macroscale homogeneity.

As such, this disclosure provides a solution to situations where limited toughness of conventional silicone elastomers, e.g. that are used in applications such as UV-curable conformal coatings and adhesives, is problematic. Conventional blends or mixes of different materials featuring high glass transition temperature (Tg) polymers, for example, have the potential to increase hardness, but typically suffer from a decrease in fracture toughness (embrittlement), and typically result in "worst of both worlds" performance due to large scale phase separation.

The method of this disclosure solves the problem of obtaining toughened silicone-organic hybrid materials that can be UV-cured and offers the benefits of significantly enhanced fracture toughness while avoiding or minimizing the opacity that is associated with large scale phase separation that arises from immiscibility of organic polymer in silicone host material.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A method of preparing a silicone-acrylate hybrid composition, said method comprising:
    combining a silicone article and an acrylate composition to form a swollen silicone material comprising the acrylate composition dispersed in the silicone article; and
    irradiating the swollen article to polymerize the acrylate composition and give the silicone-acrylate hybrid composition, wherein the step of irradiating is carried out in the absence of any solvent;
    wherein the acrylate composition comprises:
        an acrylate compound having the general formula (A):

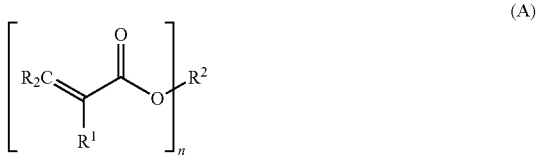

(A)

wherein each R is independently selected from H and substituted or unsubstituted hydrocarbyl groups, $R^1$ is H or a substituted or unsubstituted hydrocarbyl group having from 1 to 10 carbon atoms, n is an integer equal to or greater than 1, and $R^2$ is selected from $R^1$, an amine group, an alkoxy group, an alkyl group, an alkyl group substituted with a hydroxyl group or an amino group, or a moiety having a valency of n greater than 1 to 4; and
    an initiator;
    wherein the silicone-acrylate hybrid composition comprises a solid interpenetrating polymer network.

2. The method of claim 1, wherein the acrylate composition is irradiated in the presence of the silicone article, and wherein: (i) the method further comprises preparing the silicone article; (ii) the silicone article is formed from an addition-curable silicone composition or a condensation-curable silicone composition; or (iii) both (i) and (ii).

3. The method of claim 2, wherein the silicone article is formed from a hydrosilylation-curable composition.

4. The method of claim 2, wherein the silicone article is formed from a condensation-curable composition.

5. The method of claim 1, wherein: (i) the acrylate composition further comprises a multifunctional acrylate compound different from the acrylate compound of general formula (A); (ii) the acrylate composition further comprises acrylic acid other than the acrylate compound of general formula (A); (iii) $R^2$ is an alkoxy group; (iv) each R is H; or (v) any combination of (i) to (iv).

6. The method of claim 1, wherein the silicone-acrylate hybrid composition comprises a silicone article and an acrylate polymer, and wherein: (i) the silicone article and the acrylate polymer are physically at least partially interlaced; (ii) the silicone article and the acrylate polymer are chemically bonded to one another; or (iii) both (i) and (ii).

7. The method of claim 1, wherein the silicone-acrylate hybrid composition is disposed on a substrate.

8. The method of claim 7, wherein the substrate comprises an electronic device.

* * * * *